United States Patent [19]

Baba

[11] Patent Number: 4,478,320

[45] Date of Patent: Oct. 23, 1984

[54] OVERLOAD-RESPONSIVE CLUTCH APPARATUS FOR SELECTIVE CONNECTION OF TWO DRIVE SHAFTS TO A SINGLE DRIVEN SHAFT

[75] Inventor: Kiyokazu Baba, Komatsu, Japan

[73] Assignee: Kabushiki Kaisha Komatsu Seisakusho, Tokyo, Japan

[21] Appl. No.: 428,797

[22] Filed: Sep. 30, 1982

[30] Foreign Application Priority Data

Oct. 12, 1981 [JP] Japan .......................... 56-150018[U]

[51] Int. Cl.$^3$ ......................... F16D 7/00; F16D 21/02
[52] U.S. Cl. ............................. 192/48.91; 192/56 F; 192/87.17; 192/150; 74/661
[58] Field of Search .................. 192/48.9, 48.91, 56 F, 192/85 A, 87.17, 150; 74/661

[56] References Cited

U.S. PATENT DOCUMENTS

| | | | |
|---|---|---|---|
| 3,487,772 | 1/1970 | Kraft | 192/150 |
| 3,774,740 | 11/1973 | Kubota | 192/150 |
| 4,096,798 | 6/1978 | Moskaljk | 192/150 |
| 4,405,029 | 9/1983 | Hunt | 192/48.91 |

Primary Examiner—Rodney H. Bonck
Assistant Examiner—James J. Merek
Attorney, Agent, or Firm—Armstrong, Nikaido, Marmelstein & Kubovcik

[57] ABSTRACT

A fluid-operated piston is mounted on a driven shaft for joint rotation therewith and for sliding motion in its axial direction. Driven from a first drive shaft, a bevel gear is rotatably mounted on the driven shaft, while being locked against axial displacement, and held opposite to one end of the piston via a first clutch. A rotor on a second drive shaft is opposed to the other end of the piston via a second clutch. A hydraulic control circuit is provided for selective delivery of a hydraulic fluid under pressure into a pair of opposed fluid chambers in order to urge the piston into engagement with either the bevel gear or the rotor via the corresponding one of the clutches. Normally held engaged to allow the first drive shaft to drive the driven shaft, the first clutch disengages automatically against the fluid pressure in one of the fluid chambers when the torque being transmitted from the bevel gear to the piston exceeds a predetermined limit, thereby avoiding the overloading of the driven shaft by the first drive shaft. The driven shaft can then be driven from the second drive shaft with reduced torque.

4 Claims, 3 Drawing Figures

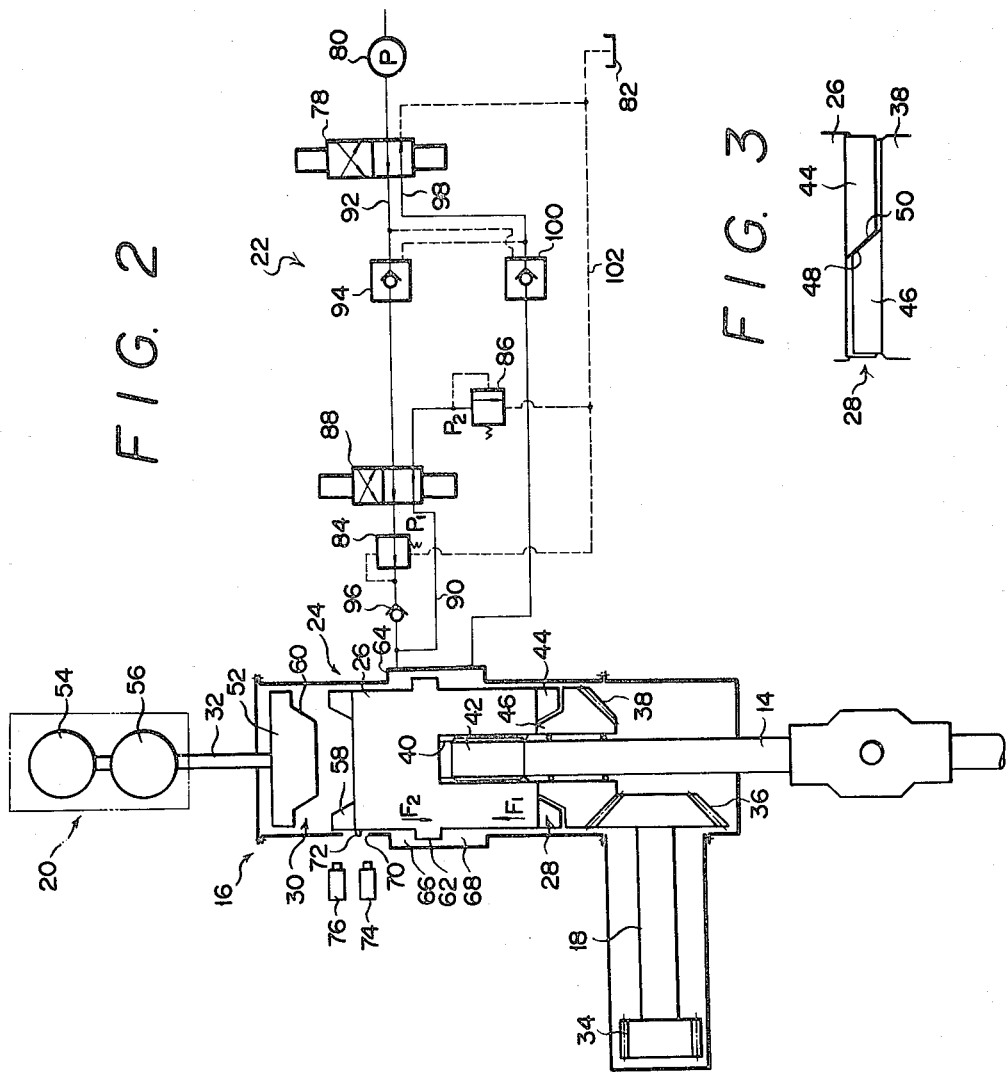

OVERLOAD-RESPONSIVE CLUTCH APPARATUS FOR SELECTIVE CONNECTION OF TWO DRIVE SHAFTS TO A SINGLE DRIVEN SHAFT

BACKGROUND OF THE INVENTION

The present invention relates to clutch apparatus capable of selectively connecting two drive shafts to a driven shaft, normally holding one drive shaft connected to the driven shaft and, when the latter is overloaded, connecting the other drive shaft to the driven shaft. The clutch apparatus according to the invention finds a typical application in drive means for the infeed mechanism of a press.

An automatic press system is known which includes an infeed mechanism for successively feeding workpieces into the press proper in synchronism with the up-and-down movement of the slide carrying the upper die or punch. Drive means for the infeed mechanism and drive means for the press proper are interlocked for synchronizing them. It has also been known to provide, at the point of connection between the infeed drive means and the press drive means, a mechanism for preventing the former from being overloaded by the latter. When the torque being applied from the press drive means to the infeed drive means becomes so great that the infeed mechanism might be destroyed, the overload prevention mechanism functions to disconnect the press and the infeed drive means. So disconnected from the press drive means, the infeed drive means are powered from a separate drive source of smaller output torque totally independent of the press drive means.

An objection to the above description prior art is that the overload prevention mechanism and the drive source for the infeed mechanism have been provided separately, not structurally integrated. This of course is undesirable in view of the larger space requirement and the higher manufacturing cost.

SUMMARY OF THE INVENTION

The invention remedies the noted drawback of the prior art and provides a compact, inexpensive, self-contained clutch apparatus particularly well suited for selectively connecting a press drive shaft and another drive shaft, powered by a drive source of relatively small output torque, to an infeed drive shaft in an automatic press system of the type under consideration.

In its broader aspect the invention may be summarized as apparatus for selectively connecting a first and a second drive shaft to a single driven shaft. The first drive shaft is coupled in driving relationship to a first rotor which is mounted on the driven shaft for relative rotation but which is locked against axial displacement relative to the driven shaft. The first rotor lies opposite to one end of a piston mounted on the driven shaft for joint rotation therewith and for relative axial reciprocation. The second drive shaft is coupled in driving relationship to a second rotor disposed opposite to the other end of the piston. First and second clutches are provided between the first rotor and the piston and between the second rotor and the piston, respectively. The first clutch is adapted for automatic disconnection of the first rotor and the piston when the torque being transmitted from the former to the latter exceeds a predetermined limit. First and second opposed fluid chambers are provided for fluid pressure actuation of the piston into clutch engagement with either the first or the second rotor.

Also included is a fluid control circuit by which the first fluid chamber is normally held supplied with fluid under pressure for holding the piston connected to the first rotor via the first clutch. The fluid pressure in the first fluid chamber is such that the piston is free to be declutched and displaced away from the first rotor when the torque being transmitted from the latter to the piston exceeds the predetermined limit. With the piston thus displaced away from the first rotor, the fluid control circuit delivers the pressurized fluid into the second fluid chamber for moving the piston into engagement with the second rotor via the second clutch.

In a preferred embodiment, in which the overload-responsive clutch apparatus outlined above is adapted for driving the infeed mechanism of the automatic press system explained previously, the driven shaft is linked to the infeed mechanism. The first drive shaft is linked to the press slide to cause same to move up and down. The second drive shaft is the output shaft of a motor drive unit provided exclusively for powering the infeed mechanism. Normally, therefore, the infeed mechanism is driven from the same shaft as is the press slide, and so operates to feed work into the press proper in timed relation to the up-and-down movement of the slide. When the driven shaft is overloaded by the first drive shaft, the clutch apparatus disconnects the first drive shaft from the driven shaft and connects the second drive shaft to the driven shaft. Thus the clutch apparatus integrally includes facilities for protecting the infeed mechanism against overloading by the press drive shaft and for powering the infeed mechanism by its own motor drive unit.

The above and other features and advantages of this invention and the manner of attaining them will become more apparent, and the invention itself will best be understood, from a study of the following description of the preferred embodiment taken together with the attached drawings.

BRIEF DESCRIPTION OF THE DRAWINGS

FIG. 2 is a diagrammatic representation showing in greater detail the overload-responsive clutch assembly of FIG. 1 together with its fluid control circuit, the clutch assembly and the fluid control circuit consisting in combination the clutch apparatus of this invention; and FIG. 3 is a slightly enlarged elevation of one of the clutches in the clutch assembly of FIG. 2.

DESCRIPTION OF THE PREFERRED EMBODIMENT

Figure 1:
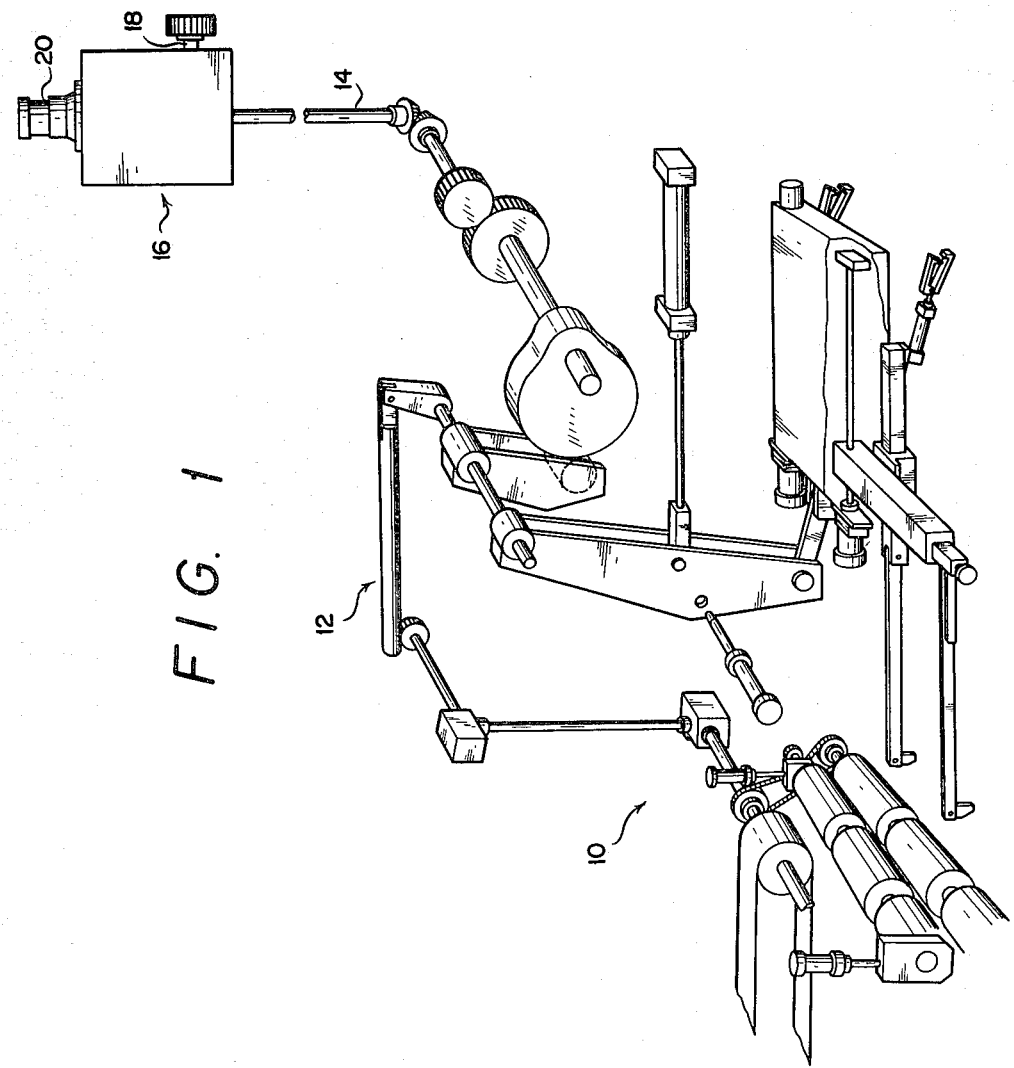
FIG. 1 schematically illustrates in perspective the general configuration of a typical press infeed mechanism and its drive system including an overload-responsive clutch assembly in accordance with the present invention.

The overload-responsive clutch apparatus of this invention will now be described in detail as adapted for use in the known automatic press system. As illustrated in FIG. 1, the press system includes an infeed mechanism, generally designated 10, for successively feeding workpieces into a press proper, not shown, in synchronism with the up-and-down movement of its slide. The infeed mechanism 10 is coupled via a drive linkage 12 to an infeed drive shaft 14 depending from an overload-responsive clutch assembly 16 in accordance with the invention. Projecting laterally from the clutch assembly 16 is a press drive shaft 18 which is coupled to the unshown press slide to cause its up-and-down movement, besides being normally connected to the infeed drive shaft 14 via the clutch assembly 16. The clutch assembly 16 has a motor drive unit 20 for driving the infeed drive shaft 14 upon declutching of the press drive shaft 18 therefrom.

Normally, as aforesaid, the clutch assembly 16 holds the press drive shaft 18 connected to the infeed drive shaft 14, thereby causing the infeed mechanism 10 to feed the successive workpieces into the unshown press in timed relation to the up-and-down movement of its slide. When the infeed drive shaft 14 is overloaded, the clutch assembly 16 immediately disconnects the press drive shaft 18 therefrom. Then the output shaft of the motor drive unit 20 is connected to the infeed drive shaft 14 to reset the infeed mechanism 10 into operation.

No further description of FIG. 1 will be necessary as it is meant to illustrate one possible application of the overload-responsive clutch appartus of this invention as simply as possible. A better understanding of the inventive apparatus including the clutch assembly 16 will be had from the following description of FIGS. 2 and 3.

FIG. 2 is a more detailed representation of the overload-responsive clutch assembly 16 as well as of an associated fluid control circuit 22. The clutch assembly 16 and the fluid control circuit 22 combine to make up the overload-responsive clutch apparatus in accordance with the invention. Broadly, the clutch assembly 16 comprises:

1. A generally tubular housing 24.
2. A piston 26 reciprocably mounted in the housing 24 and splinedly mounted on the infeed drive shaft 14 for joint rotation therewith and for sliding motion in its axial direction.
3. A first clutch 28 for connecting and disconnecting the press drive shaft 18 and the piston 26.
4. A second clutch 30 for connecting and disconnecting the output shaft 32 of the motor drive unit 20 and the piston 26.

It will now be seen that the infeed drive shaft 14 is the driven shaft as far as the clutch apparatus of FIG. 2 is concerned. The press drive shaft 18 and the motor output shaft 32, then, are the first and the second drive shafts, respectively, to be selectively connected to the driven shaft.

The press drive shaft 18 has a gear 34 on one end for connection to the drive linkage to the slide of the press system. Mounted on the other end of the press drive shaft 18 is a driving bevel gear 36 in mesh with a driven bevel gear 38 on the infeed drive shaft 14. The driven bevel gear 38 is free to rotate relative to the infeed drive shaft 14 but is locked against axial displacement relative to same. The piston 26 is bored axially and internally straight-splined at 40 to fit over a correspondingly straight-splined end portion 42 of the infeed drive shaft 14. Thus the piston 26 rotates simultaneously with the infeed drive shaft 14 but is free to travel axially thereof.

One end of the piston 26 is opposed to the driven bevel gear 38 via the first clutch 28. As illustrated in further detail in FIG. 3, the first clutch 28 is a type of jaw clutch, having wedge-shaped jaws 44 and 46 movable into and out of engagement with each other. The contacting flanks 48 and 50 of the mating jaws are angled in such a way that, during torque transmission from bevel gear 38 to piston 26, the jaws exert a force tending to move the gear and the piston away from each other. Actually, when the torque exceeds a predetermined limit, the piston 26 moves away from the bevel gear 38, resulting in the disengagement of the first clutch 28.

With reference back to FIG. 2 the other end of the piston 26 is opposed via the second clutch 30 to a rotor 52 fixedly mounted on the output shaft 32 of the motor drive unit 20. The motor drive unit conventionally comprises a drive motor 54 and a speed reducer 56. Although the second clutch 30 can be of any known or suitable construction, it is herein shown as a jaw clutch comprising mating wedge-shaped jaws 58 and 60.

The piston 26 has formed thereon an annular rib 62 in sliding but pressure-tight contact with the inside surface of a greater diameter portion 64 of the housing 24. Thus are defined a pair of opposed fluid chambers 66 and 68 on the opposite sides of the piston rib 62. The piston 26 travels toward the bevel gear 38, with the consequent engagement of the first clutch 28, upon delivery of a hydraulic fluid under pressure into the first fluid chamber 66. Upon delivery of the pressurized fluid into the second fluid chamber 68, on the other hand, the piston travels toward the rotor 52 with the consequent engagement of the second clutch 30.

The housing 24 is slotted longitudinally at 70. Projecting out of this slot is a switch actuator 72 on the piston 26. The switch actuator 72 activates (turns on) an electrical switch 74 when the piston 26 is connected to the bevel gear 38 via the first clutch 28, and another similar switch 76 when the piston is connected to the rotor 52 via the second clutch 30.

The fluid control circuit 22 controls fluid flow to and from the opposed fluid chambers 66 and 68 for the proper functioning of the clutch assembly 16. The fluid control circuit broadly comprises:

1. A first selector valve 78 for selectively communicating the fluid chambers 66 and 68 with a source 80 of hydraulic fluid under pressure and with a fluid drain 82.
2. A pressure reducing valve 84 interposed between first selector valve 78 and first fluid chamber 66 for normally maintaining the fluid pressure in the first chamber at a first preset level P1.
3. A pressure relief valve 86 for placing the first fluid chamber 66 in communication with the fluid drain 82 when the fluid pressure in the first chamber builds up to a second preset level P2 higher than the first preset level P1.
4. A second selector valve 88 which, on actuation, communicates the first selector valve 78 with the first fluid chamber 66 by way of a line 90 bypassing the reducing valve 84.

The first selector valve 78 is a four-way, two-position valve. When in the normal position as shown, the first selector valve places the source 80 in communication with a first main line 92 leading to the first fluid chamber 66 via a check valve 94, the second selector valve 88, the reducing valve 84 and a check valve 96. The first selector valve 78 when in the normal position also places the drain 82 in communication with a second main line 98 leading to the second fluid chamber 68 via a check valve 100. When shifted to its offset position, the first selector valve communicates the source 80 with the second main line 98, and the drain 82 with the first main line 92. The check valve 94 on the first main line 92 is pilot operated to open when the second main line 98 is pressurized. The other check valve 100 on the second main line 98 is likewise pilot operated to open when the first main line 92 is pressurized.

The second selector valve 88 is also a four-way, two-position valve. When in the normal position as shown, the second selector valve allows communication between first selector valve 78 and reducing valve 84, and between first fluid chamber 66 and relief valve 86 by way of the bypass line 90. When shifted to its offset position, the second selector valve 88 communicates the first main line 92 with the bypass line 90 thereby allowing the pressurized fluid from the source 80 to flow directly into the first fluid chamber 66. The fluid outlet of the relief valve 86 communicates with the drain 82 by way of a drain line 102.

The first preset pressure P1 at which the fluid in the first fluid chamber 66 is normally maintained by the reducing valve 84 is less than the second preset pressure P2 at which the relief valve 86 opens. The second preset pressure P2 is less than the output pressure of the source 80.

In the operation of the overload-responsive clutch apparatus constructed as in FIG. 2, let it first be assumed that the first 78 and second 88 selector valves of the fluid control circuit 22 are both in the normal positions as shown. Then the pressurized fluid from the source 80 is directed into the first fluid chamber 66 of the clutch assembly 16 by way of the first main line 92, whereas the fluid in the second chamber 68 is drained by way of the second main line 98. The result is the travel of the piston 26 into engagement with the bevel gear 38 via the first clutch 28. Now the infeed drive shaft 14 is driven from the press drive shaft 18 via the intermeshing bevel gears 36 and 38 and the piston 26. It will be seen by referring back to FIG. 1 that, with the infeed drive shaft 14 thus connected to the press drive shaft 18, the infeed mechanism 10 operates to feed work into the unshown press proper in synchronism with the up-and-down movement of its slide.

The fluid pressure in the first fluid chamber 66 rises only to the first preset level P1, as determined by the reducing valve 84, which however is sufficiently high to normally hold the piston 26 connected to the bevel gear 38 via the first clutch 28. The downward force thus exerted on the piston 26 is indicated in FIG. 2 by the arrow designated F2. Upon engagement of the piston 26 with the bevel gear 38 the switch actuator 72 on the piston activates the switch 74, which thereupon puts out a signal indicative of the fact that the infeed mechanism 10 is being driven in synchronism with the press.

If the infeed drive shaft 14 is overloaded during the synchronized operation of the infeed mechanism 10, the wedge-shaped jaws 44 and 45 of the engaged first clutch 28 produce a force F1 tending to move the piston 26 away from the bevel gear 38. When the force F1 becomes greater than the opposing force F2 due to the fluid pressure in the first fluid chamber 66, the piston 26 starts moving away from the bevel gear 38, with the resulting increase in the fluid pressure in the first fluid chamber. The relief valve 86 of the fluid control circuit 22 opens when the fluid pressure in the first fluid chamber 66 rises as above to the pressure setting P2 of the relief valve, thereby bleeding off the fluid from the first chamber by way of the bypass line 90 and drain line 102. Thereupon the piston 26 travels farther away from and out of engagement with the bevel gear 38. Thus is the infeed drive shaft 14 declutched from the press drive shaft 18 and so protected from overloading.

For moving the piston 26 into engagement with the rotor 52 on the motor drive unit output shaft 32, the first selector valve 78 may be shifted to its offset position, possibly with the second selector valve 88 held in the normal position. Then the pressurized fluid flows from source 80 to second fluid chamber 68 by way of the second main line 98, whereas the fluid in the first chamber 66 is drained by way of the bypass line 90, relief valve 86 and drain line 102. Thereupon the piston 26 travels into engagement with the rotor 52 via the second clutch 30.

Now the infeed drive shaft 14 can be driven from the motor drive unit 20 provided exclusively for the infeed mechanism 10 of FIG. 1. The operation of the infeed mechanism being driven from the motor drive unit 20 is, however, not automatically synchronized with that of the press proper. This mode of operation can be sensed as the switch actuator 70 on the piston 26 activates the switch 76 upon movement of the piston into engagement with the rotor 52.

It is also possible to shift the second selector valve 88 to the offset position at the same time with the shifting of the first selector valve 78 to the offset position, for moving the piston 26 into engagement with the rotor 52 as above. In this case the fluid will be drained from the first chamber 66 by way of the bypass line 90, second selector valve 88, check valve 94 (which is then opened by the pilot pressure from the second main line 98), and first selector valve 78.

For disengaging the second clutch 30 and moving the piston 26 back into engagement with the bevel gear 38 via the first clutch 28, the first selector 78 may be actuated back to the normal position, whereas the second selector valve 88 is shifted to, or maintained in, the offset position. Then the pressurized fluid flows from source 80 to first fluid chamber 66 by way of the bypass line 90. Since the pressurized fluid does not pass the reducing valve 84, the pressure in the first fluid chamber 66 rises to the full output pressure of the source 80. Consequently the piston can be forced into firm engagement with the bevel gear 38 via the first clutch 28 under the full output pressure of the source 80.

The second selector valve 88 may be shifted back to the normal position after the firm engagement of the piston 26 with the bevel gear 38. The second selector valve 88 in the normal position places the pressurized fluid source 80 in communication with the first fluid chamber 66 via the reducing valve 84 and also places the first fluid chamber in communication with the relief valve 86. Thus, with the pressure in the first fluid chamber 66 reduced to the first preset level P1 determined by the reducing valve 84, the first clutch 36 will disengage automatically when the pressure in the first fluid chamber rises again to the second preset level P2 determined by the relief valve 86, upon overloading of the infeed drive shaft 14 by the press drive shaft 18.

Although the overload-responsive clutch apparatus in accordance with the invention has been shown and described hereinbefore as adapted for a press infeed mechanism, it is recognized that the apparatus lends itself to other applications where a single driven shaft is to be selectively coupled to two drive shafts powered by separate drive sources. It is also understood that the illustrated embodiment is susceptible to a variety of changes or modifications within the broad teaching hereof. For instance, the press drive shaft 18 need not be connected to the first clutch 28 via the bevel gearing, even though the invention requires the provision of a rotatable member essentially equivalent in function to the driven bevel gear 38. Accordingly, in the appended claims, the bevel gear 38 is more generally referred to as the first rotor, the "first" because there is one other rotor 52 required, which is referred to as the second rotor.

The above and other variations within the usual knowledge of one skilled in the art are considered to fall within the scope of the invention as expressed in the following claims.

What is claimed is:

1. Overload-responsive clutch apparatus comprising:
   (a) a driven shaft;
   (b) a first rotor rotatably mounted on the driven shaft and locked against axial displacement relative to same;
   (c) a first drive shaft coupled to the first rotor in driving relationship;
   (d) a piston mounted on the driven shaft for joint rotation therewith and for sliding movement in the axial direction thereof, the piston having one end held opposite to the first rotor;
   (e) a first clutch for connecting and disconnecting the first rotor and the piston, the first clutch being adapted to disengage automatically when the torque being transmitted from the first rotor to the piston exceeds a predetermined limit;
   (f) a second rotor disposed opposite to another end of the piston in coaxial relationship;
   (g) a second drive shaft coupled to the second rotor in driving relationship;
   (h) a second clutch for connecting the second rotor to the piston when the latter is declutched from the first rotor;
   (i) means defining first and second opposed fluid chambers for urging the piston in opposite axial directions relative to the driven shaft; and
   (j) a fluid control ciruit for normally holding the first fluid chamber supplied with a fluid under pressure in order to hold the piston connected to the first rotor via the first clutch and for allowing the piston to be displaced away and declutched from the first rotor when the torque being transmitted from the first rotor to the piston exceeds the predetermined limit, the fluid control circuit being further adapted to deliver the pressurized fluid into the second fluid chamber in order to move the piston into engagement with the second rotor via the second clutch.

2. The overload-responsive clutch apparatus as recited in claim 1, wherein the fluid control circuit comprises:
   (a) a source of the pressurized fluid;
   (b) a selector valve for selectively communicating the first and second fluid chambers with the pressurized fluid source and with a fluid drain;
   (c) a first pressure control valve interposed between the selector valve and the first fluid chamber for maintaining the pressurized fluid in the first fluid chamber at a first preset pressure which is sufficiently high to normally hold the piston connected to the first rotor via the first clutch; and
   (d) a second pressure control valve interposed between the first fluid chamber and the fluid drain in order to establish communication therebetween when the fluid pressure in the first chamber builds up to a second preset pressure higher than the first preset pressure.

3. The overload-responsive clutch apparatus as recited in claim 2, wherein the fluid control circuit further comprises a second selector valve normally allowing communication between the first recited selector valve and the first pressure control valve and, on actuation, communicating the first selector valve directly with the first fluid chamber via a line bypassing the first pressure control valve, whereby the fluid pressure in the first fluid chamber can be increased to the full output pressure of the pressurized fluid source in moving the piston into engagement with the first rotor via the first clutch.

4. The overload-responsive clutch apparatus as recited in claim 1, further comprising a motor drive unit having an output shaft serving as the second drive unit.

* * * * *